United States Patent
Zhuang et al.

(10) Patent No.: US 9,847,816 B2
(45) Date of Patent: Dec. 19, 2017

(54) DIGITAL TRANSPORT OF DATA OVER DISTRIBUTED ANTENNA NETWORK

(71) Applicant: Dali Systems Co. Ltd., George Town, Grand Cayman (KY)

(72) Inventors: Qianqi Zhuang, Richmond (CA); Shawn Patrick Stapleton, Burnaby (CA)

(73) Assignee: Dali Systems Co. Ltd., George Town (KY)

( * ) Notice: Subject to any disclaimer, the term of this patent is extended or adjusted under 35 U.S.C. 154(b) by 15 days.

(21) Appl. No.: 14/574,071

(22) Filed: Dec. 17, 2014

(65) Prior Publication Data

US 2015/0207545 A1    Jul. 23, 2015

Related U.S. Application Data

(60) Provisional application No. 61/918,386, filed on Dec. 19, 2013.

(51) Int. Cl.
*H04L 1/00*    (2006.01)
*H04B 7/024*    (2017.01)

(52) U.S. Cl.
CPC ................. *H04B 7/024* (2013.01)

(58) Field of Classification Search
CPC ............ H04B 7/18528; H04B 7/18571; H04B 7/2121; H04B 7/2123; H04W 84/06; H04W 72/04; H04W 72/12; H04W 76/00; H04J 2203/0069; H04Q 2213/394
USPC ............... 370/328, 329; 455/450, 451, 452.1
See application file for complete search history.

(56) References Cited

U.S. PATENT DOCUMENTS

| | | | |
|---|---|---|---|
| 2007/0001821 A1 | 1/2007 | Berkman | |
| 2008/0107014 A1* | 5/2008 | Huang ................. | H04W 28/16 370/216 |
| 2012/0057572 A1* | 3/2012 | Evans ................. | H04W 88/085 370/338 |
| 2012/0069880 A1 | 3/2012 | Lemson et al. | |
| 2012/0127938 A1 | 5/2012 | Lv et al. | |
| 2013/0272202 A1 | 10/2013 | Stapleton et al. | |

OTHER PUBLICATIONS

International Search Report, dated Mar. 20, 2015, for International Patent Application No. PCT/US2014/71244, 2 pages.
Written Opinion, dated Mar. 20, 2015, for International Patent Application No. PCT/US2014/71244, 7 pages.
PCT/US2014/071244, "International Preliminary Report on Patentability", dated Jun. 30, 2016, 9 pages.

* cited by examiner

*Primary Examiner* — Dady Chery
(74) *Attorney, Agent, or Firm* — Kilpatrick Townsend & Stockton LLP

(57) ABSTRACT

A system for transporting data in a Distributed Antenna System (DAS) includes at least one Digital Access Unit (DAU) and a plurality of Digital Remote Units (DRUs) coupled to the at least one DAU. The plurality of DRUs are operable to transport signals between the plurality of DRUs and the at least one DAU. The at least one DAU includes: a data transport coder comprising: a framer, an encoder, a scrambler, and a serializer and a data transport decoder comprising: a deserializer, a decoder, a descrambler, a frame synchronizer, and a deframer.

18 Claims, 9 Drawing Sheets

Data Frame Structure

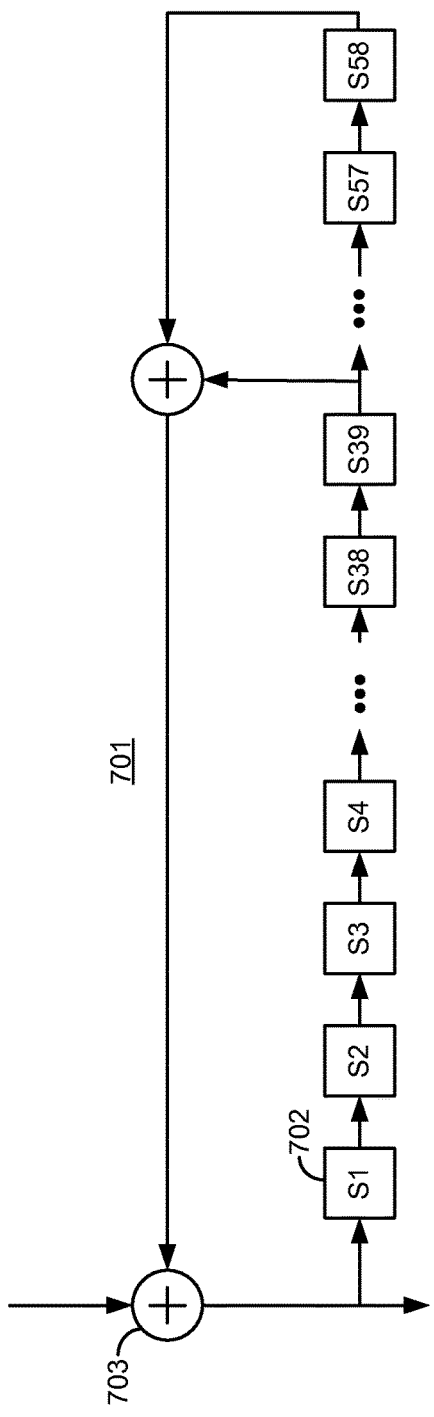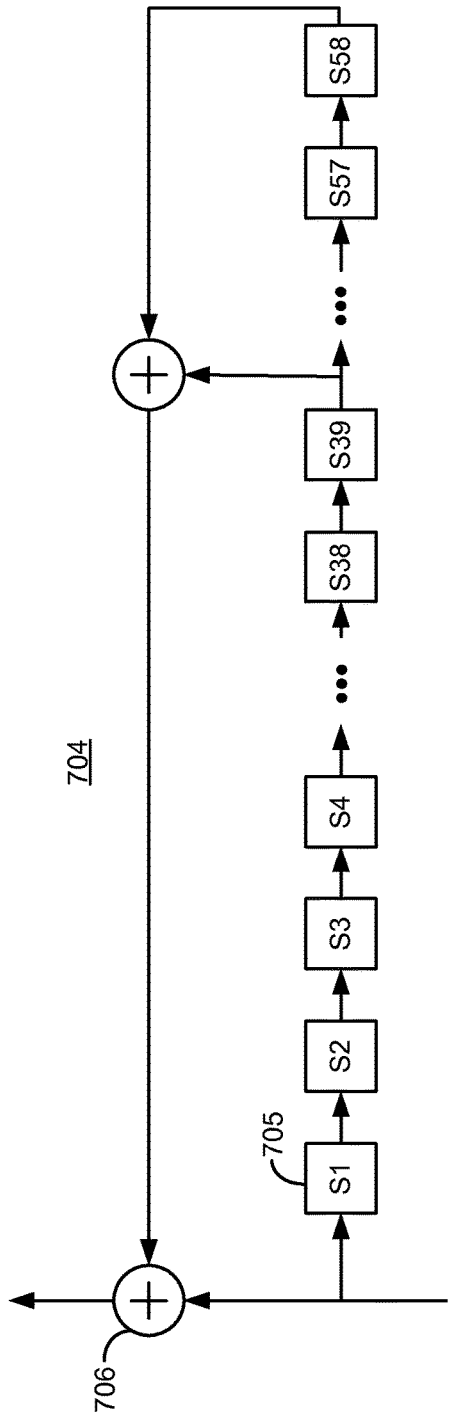

DIGITAL TRANSPORT OF DATA OVER DISTRIBUTED ANTENNA NETWORK

CROSS-REFERENCES TO RELATED APPLICATIONS

This application claims priority to U.S. Provisional Patent Application No. 61/918,386, filed on Dec. 19, 2013, entitled "Digital Transport of Data Over Distributed Antenna Networks," the disclosure of which is hereby incorporated by reference in its entirety for all purposes.

BACKGROUND OF THE INVENTION

Wireless and mobile network operators face the continuing challenge of building networks that effectively manage high data-traffic growth rates. Mobility and an increased level of multimedia content for end users requires end-to-end network adaptations that support both new services and the increased demand for broadband and flat-rate Internet access. One of the most difficult challenges faced by network operators is caused by the physical movement of subscribers from one location to another, and particularly when wireless subscribers congregate in large numbers at one location. A notable example is a business enterprise facility during lunchtime, when a large number of wireless subscribers visit a cafeteria location in the building. At that time, a large number of subscribers have moved away from their offices and usual work areas. It's likely that during lunchtime there are many locations throughout the facility where there are very few subscribers. If the indoor wireless network resources were properly sized during the design process for subscriber loading as it is during normal working hours when subscribers are in their normal work areas, it is very likely that the lunchtime scenario will present some unexpected challenges with regard to available wireless capacity and data throughput.

To address these issues, Distributed Antenna Systems (DAS) have been developed and deployed. Despite the progress made in DAS, there is a need in the art for improved methods and systems related to DAS.

SUMMARY OF THE INVENTION

The present invention generally relates to communication systems using complex modulation techniques. More specially, the present invention relates to distributed antenna systems that contain a microprocessor or other digital components, such as a Field Programmable Gate Array (FPGA) or Application Specific Integrated Circuit (ASIC). Timing synchronization in a Distributed Antenna system is sensitive to the data content that is transported on the network. Cellular data is prone to long periods of weak signals being present which can lead to long runs of zeroes. A scrambler/descrambler is an effective technique to combat clock drift in a high data rate link. Embodiments of the present invention provide an efficient and effective method of insuring clock timing synchronization in a remote unit to which data has been transported over a digital link from a host unit to the remote unit.

Embodiments of the present invention provide systems and techniques that are based on performing scrambling on the transmitted downlink data at the Host unit and then descrambling on the received data at the remote unit. Likewise, scrambling and descrambling are used for the transmitted uplink data being transported between the Remote and the Host unit.

According to an embodiment of the present invention, a system for transporting data in a Distributed Antenna System (DAS) is provided. The system includes at least one Digital Access Unit (DAU) and a plurality of Digital Remote Units (DRUs) coupled to the at least one DAU. The plurality of DRUs are operable to transport signals between the plurality of DRUs and the at least one DAU. The at least one DAU includes: a data transport coder comprising: a framer, an encoder, a scrambler, and a serializer and a data transport decoder comprising: a deserializer, a decoder, a descrambler, a frame synchronizer, and a deframer.

According to a specific embodiment of the present invention, a system for transporting data in a Distributed Antenna System. The system includes a plurality of Digital Access Units (DAUs). The plurality of DAUs are coupled and operable to route signals between the plurality of DAUs. The system also includes a plurality of Digital Remote Units (DRUs) coupled to the plurality of DAUs and operable to transport signals between the plurality of DRUs and the plurality of DAUs. Each of the plurality of DRUs includes: a data transport coder comprising: a framer, encoder, scrambler and serializer and a data transport decoder comprising: a deserializer, decoder, descrambler, frame synchronizer and deframer; and a scheduler/dispatcher.

According to a particular embodiment of the present invention, a method of providing serialized data is provided. The method includes receiving payload I & Q data and receiving IP data. The method also includes framing the payload I & Q data and the IP data and encoding the frame. The method further includes scrambling the encoded frame to provide scrambled data and serializing the scrambled data.

According to another particular embodiment of the present invention, a method of transmitting RF data and IP data is provided. The method includes receiving the RF data at an RF port of a Digital Access Unit (DAU), receiving the IP data at an Ethernet port of the DAU, processing the RF data to provide digital payload I & Q data, and framing the digital payload I & Q data and the IP data to provide framed data. The method also includes encoding the framed data, scrambling the encoded data, serializing the scrambled data, and transmitting the serialized data through an optical fiber to a Digital Remote Unit (DRU). The method further includes deserializing the serialized data, descrambling the deserialized data, extracting frame synchronization for the descrambled data, and decoding the descrambled data. The method additionally includes converting the decoded data to provide a representation of the RF data and the IP data, amplifying the representation of the RF data and the IP data, and transmitting the amplified RF data and IP data from an antenna associated with the DRU.

According to a specific embodiment of the present invention, a system for transporting data in a Distributed Antenna System is provided. The system includes a plurality of Digital Access Units (DAUs). The plurality of DAUs are coupled and operable to route signals between the plurality of DAUs. The system also includes a plurality of Digital Remote Units (DRUs) coupled to the plurality of DAUs and operable to transport signals between DRUs and DAUs, a data transport coder comprising: a framer, encoder, scrambler and serializer, and a data transport decoder comprising: a deserializer, decoder, descrambler, frame synchronizer and deframer.

According to another specific embodiment of the present invention a, system for transporting data in a Distributed Antenna System is provided. The system includes a plurality of Digital Access Units (DAUs). The plurality of DAUs are coupled and operable to route signals between the plurality of DAUs. The system also includes a plurality of Digital Remote Units (DRUs) coupled to the plurality of DAUs and operable to transport signals between DRUs and DAUs, a data transport coder comprising: a framer, encoder, scrambler and serializer. The system also includes a data transport decoder comprising: a deserializer, decoder, descrambler, frame synchronizer and deframer. The system further includes a scheduler and dispatcher.

According to yet another specific embodiment of the present invention, a system for transporting data in a Distributed Antenna System includes a plurality of Digital Access Units (DAUs), wherein the plurality of DAUs are coupled and operable to route signals between the plurality of DAUs. The system also includes a plurality of Digital Remote Units (DRUs) coupled to the plurality of DAUs and operable to transport signals between DRUs and DAUs and a plurality of Base Transceiver Stations (BTS). The system also includes a data transport coder comprising: a framer, encoder, scrambler and serializer, and a data transport decoder comprising: a deserializer, decoder, descrambler, frame synchronizer and deframer.

Numerous benefits are achieved by way of the present invention over conventional techniques. For example, embodiments of the present invention provide improved clock timing synchronization utilized in the transmission of cellular data. The present invention is applicable to any communication system that transports cellular data over a medium. In some embodiments, a communication link is established between a local host unit and a remote unit. A Field Programmable Gate Array (FPGA) or Application Specific Integrated Circuit (ASIC) that incorporates a processor, such as a Power PC or Microblaze, can be used to control the data flow to and from the Remote Unit. These and other embodiments of the invention along with many of its advantages and features are described in more detail in conjunction with the text below and attached figures.

BRIEF DESCRIPTION OF THE DRAWINGS

FIG. 7A is a block diagram of a scrambler for framed data according to an embodiment of the present invention.

FIG. 7B is a block diagram of a descrambler for framed data according to an embodiment of the present invention.

DETAILED DESCRIPTION OF SPECIFIC EMBODIMENTS

A distributed antenna system (DAS) provides an efficient means of utilization of base station resources. The base station or base stations associated with a DAS can be located in a central location and/or facility commonly known as a base station hotel. The DAS network comprises one or more digital access units (DAUs) that function as the interface between the base stations and the digital remote units (DRUs). The DAUs can be collocated with the base stations. The DRUs can be daisy chained together and/or placed in a star configuration and provide coverage for a given geographical area. The DRUs are typically connected with the DAUs by employing a high-speed optical fiber link. This approach facilitates transport of the RF signals from the base stations to a remote location or area served by the DRUs.

Figure 1:
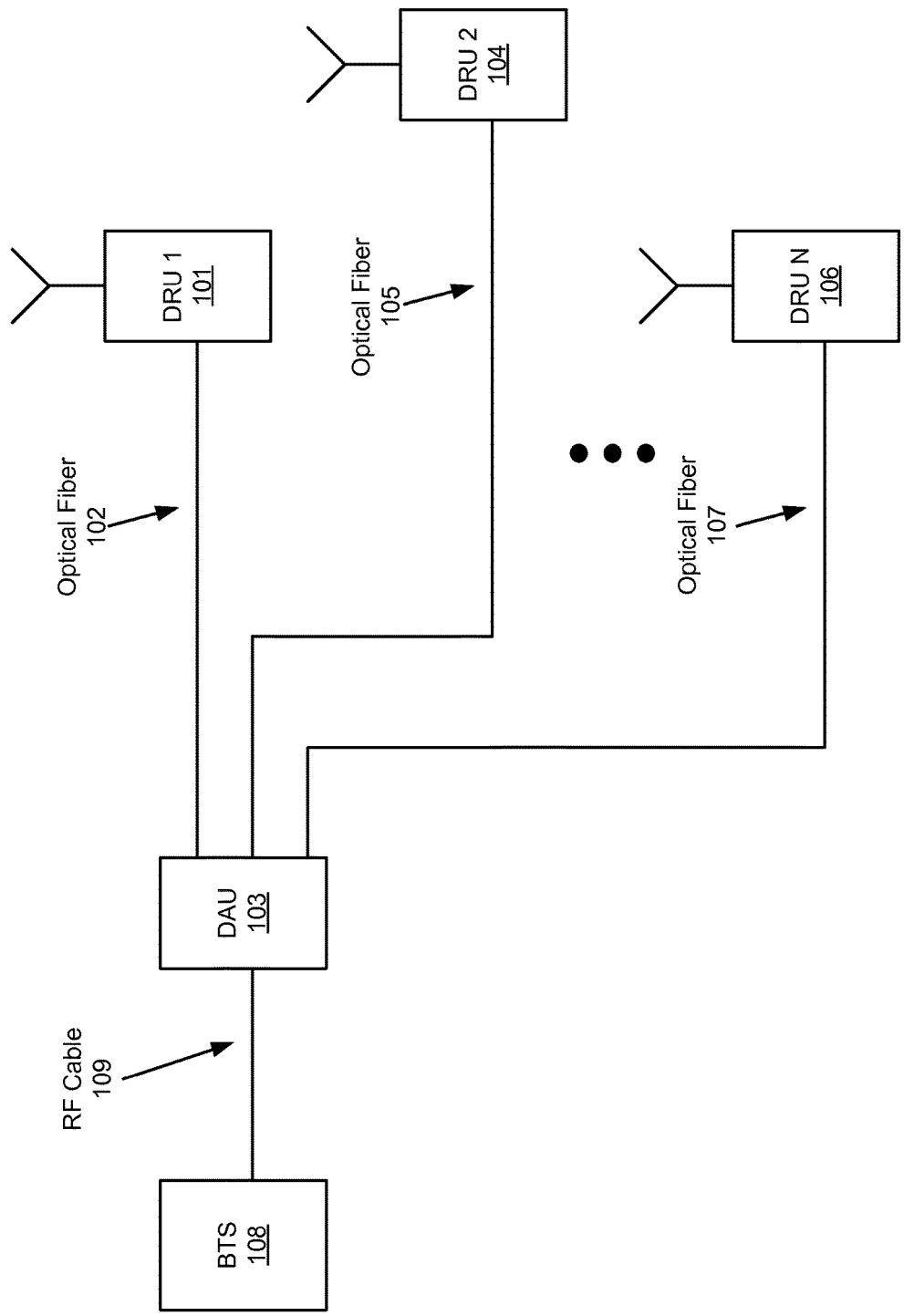
FIG. 1 is a block diagram showing a Distributed Antenna System (DAS), which includes one or more Digital Access Units (DAUs) and one or more Digital Remote Units (DRUs).

An embodiment shown in FIG. 1 illustrates a basic DAS network architecture according to an embodiment of the present invention and provides an example of a data transport scenario between a Base Transceiver Station 108, also referred to as a base station, and multiple DRUs 101, 104, and 106. In this embodiment, the DRUs are connected to the DAU 103 in a star configuration to achieve coverage in a specific geographical area.

FIG. 1 is a block diagram of one embodiment of a Distributed Antenna System which includes one or more Digital Access Units 103 and one or more Digital Remote Units 101/104/106. The DAUs interface to one of more Base Transceiver Stations (BTS) 108. Up to N DRUs can be utilized in conjunction with a DAU. The BTS 108 is coupled to the DAU by an RF cable 109 suitable for carrying RF signals. In the embodiment illustrated in FIG. 1, the DAU is connected to the one or more DRUs using optical fibers 102/105/107. In other embodiments that include more than one DAU, the DAUs can be coupled via Ethernet cable, Optical Fiber, Microwave Line of Sight Link, Wireless Link, Satellite Link, or the like. Although optical fibers 102/105/107 are illustrated in FIG. 1, in other embodiments, the one or more DAUs are coupled to the plurality of DRUs via Ethernet cable, Microwave Line of Sight Link, Wireless Link, Satellite Link, or the like. Additional description related to DAS architectures is provided in U.S. patent application Ser. No. 13/211,243, filed on Aug. 16, 2011, now U.S. Pat. No. 8,682,338, the disclosure of which is hereby incorporated by reference in its entirety for all purposes.

Figure 2:
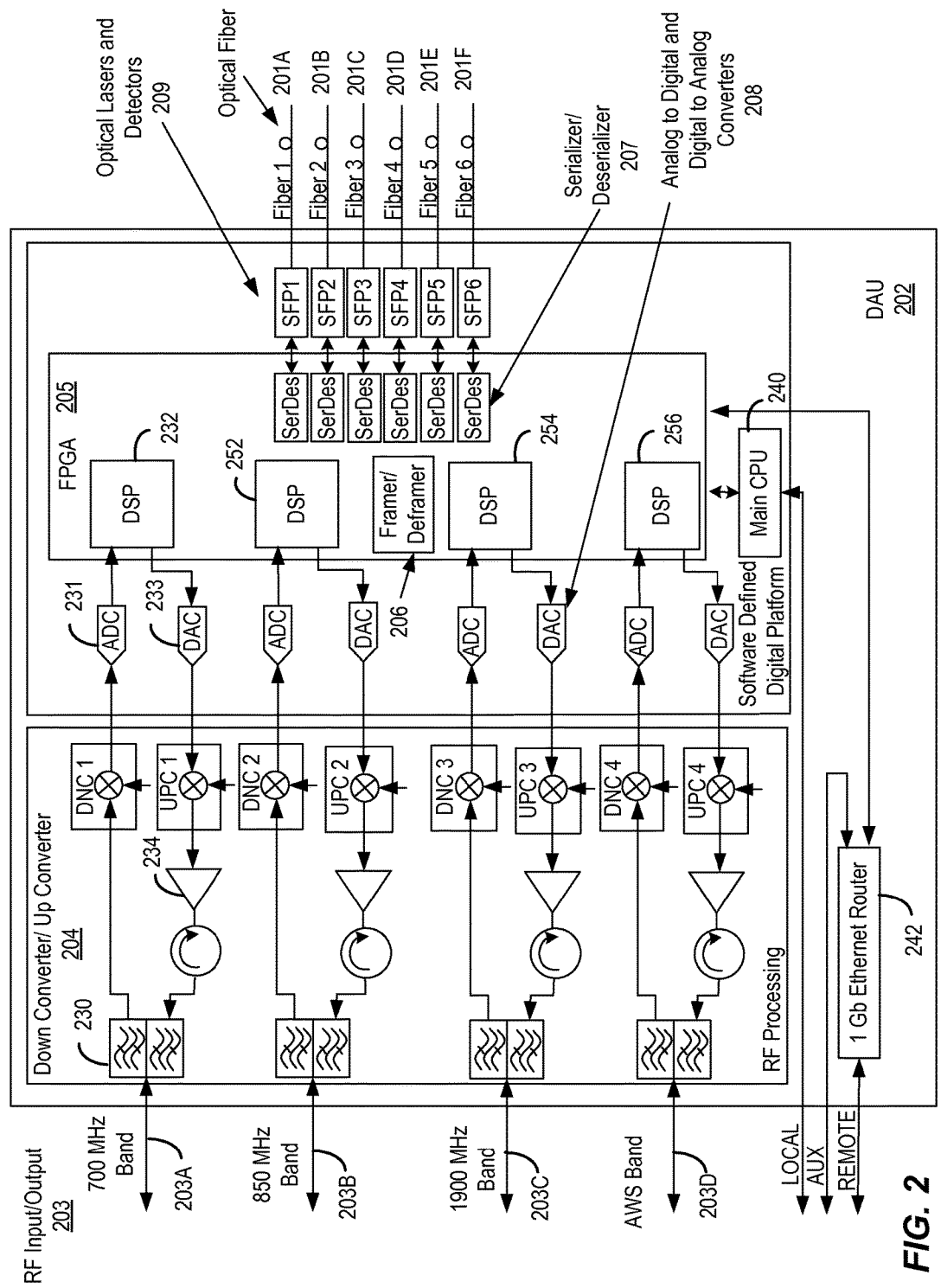
FIG. 2 is a block diagram of a Digital Access Unit (DAU).

FIG. 2 is a block diagram showing a DAU system for base-station applications according to one embodiment of the present invention. The DAU system 202 for the base-station applications has RF input and output 203 that receives and transmits RF input/output signals and optical input and output ports illustrated by optical fibers 201A-201F.

The DAU system 202 includes four key components; an FPGA-based digital component 205, a down converter and up-converter component 204, analog to digital and digital to analog converter component 208, and a optical laser and detector component 209. The FPGA-based digital component 205 includes a field programmable gate array (FPGA), digital signal processing (DSP) units, Framers/De-Framers, and Serializers/De-Serializers. Additional description related to DAUs is provided in U.S. patent application Ser. No. 12/767,669, filed on Apr. 26, 2010, Ser. No. 13/211,236, filed on Aug. 16, 2011, Ser. No. 13/211,247, filed on Aug. 16, 2011, and Ser. No. 13/602,818, filed on Sep. 4, 2012, all of which are hereby incorporated by reference in their entirety for all purposes.

As illustrated in FIG. 2, the DAU 202 is a quad-band Digital Access Unit (i.e., operating at multiple bands, which can include transmit/receive input/output at the 700 MHz 203A, 900 MHz 203B, 1900 MHz 203C, AWS 203D bands, although other bands are included within the scope of the present invention. The DAU can have an RF base station interface (typically to four sectors). Although the DAU 202 illustrated in FIG. 2 includes the four Tx/Rx RF ports described above, fewer or greater number of Tx/Rx RF ports can be utilized. On the optical interface side (i.e., the right side of FIG. 2), the DAU is connected to multiple remote radio units (RRUs), also referred to as digital remote units (RRUs) in a star configuration, a daisy chain configuration, or a combination thereof depending on the particular network design. As illustrated in FIG. 2, six optical fiber interfaces 201A-201F are utilized in the illustrated embodiment.

Referring to FIG. 2, the downlink path RF signals entering the DAU at the duplex RF input/output port 203A can be separated from uplink signals by RF duplexer 230 and frequency-converted by down converter/up converter 204, digitized by analog to digital converter 231, and converted to baseband by digital processing function 232, which is part of the FPGA 205. Similar components are utilized for the other duplex RF input/output ports as illustrated in FIG. 2. Data streams are then I/Q mapped and framed with monitoring and control signals in Framer/Deframer 206. Specific parallel data streams are then independently converted to serial data streams in SerDes 207 and translated to optical signals by pluggable SFP optical transceiver modules 209, and delivered to optical fibers 201A-201F. The six optical fibers deliver the serial optical data streams to multiple RRUs. The other three sets of downlink RF paths operate similarly.

Referring to FIG. 2, following the description above, the uplink path optical signals received from the RRUs are received using optical fibers 201A-201F, de-serialized by SerDes 207, deframed by Framer/Deframer 206, and digitally up-converted by digital processing function 232. Data streams are then converted to analog IF by digital to analog converter 233 and up-converted by upconverter UPC1, then amplified by RF amplifier 234 and filtered by duplexer 230. The uplink RF signal enters the base station at Uplink RF Port 203A. CPU 240 feeding Ethernet router 242 provides separate Ethernet ports (REMOTE and AUX) for different applications.

Figure 3:
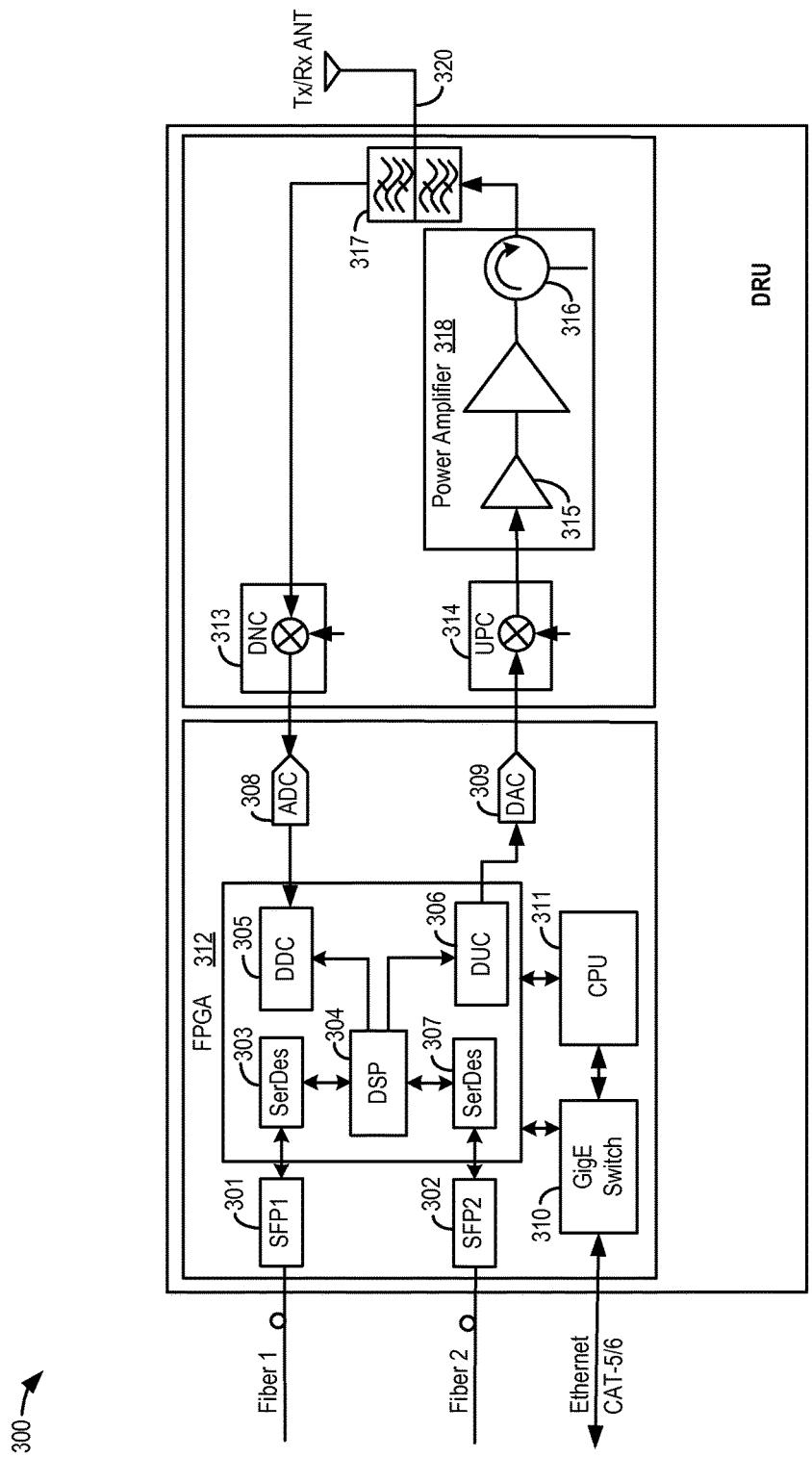
FIG. 3 is a block diagram of a Digital Remote Unit (DRU).

FIG. 3 is a block diagram showing a Digital Remote Unit (DRU) system according to one embodiment of the present invention. The DRU system 300 has bidirectional optical signals carried on one or more of Fiber 1 and/or Fiber 2 to communicate with the DAU illustrated in FIG. 2 and bidirectional RF port 320 operable to transmit and receive RF signals transmitted and received by the RF antenna (Tx/Rx ANT). The DRU system includes four key components, described more fully below: an FPGA-based digital component 312, a down converter 313 and an up-converter 314, analog to digital (308) and digital to analog converter (309) (the group labeled as 321), an optical laser and detector component that includes small form-factor pluggable (SFP) modules SFP1 and SFP2, and a power amplifier component 318.

FIG. 3 illustrates a single-band Remote Radio Head Unit, also referred to as a digital remote unit, with one combined downlink/uplink antenna port 320. In other embodiments, multi-band DRUs are utilized, for example, with downlink/uplink antenna ports operating at 850 MHz, 1900 MHz, and the like. Referring to FIG. 3, Fiber 1 connected to SFP1 301, is a high speed fiber cable that transports data between the (base station and) host unit location and the Remote Radio Head Unit. Fiber 2 can be used to daisy chain other remote radio head units, which are thereby interconnected to the base station or DAU. The software-defined digital platform 312, which can be referred to as an FPGA, performs baseband signal processing, typically in an FPGA or equivalent. The FPGA includes Serializer/Deserializer 303. The deserializer portion extracts the serial input bit stream from the optical fiber transceiver 301 and converts it into a parallel bit stream. The serializer portion performs the inverse operation for sending data from the Remote Radio Head Unit to the base station. In one embodiment, the two distinct bit streams communicate with the base stations using different optical wavelengths over one fiber, although multiple fibers can be used in alternative arrangements. The DSP unit 304 includes a framer/deframer that deciphers the structure of the incoming bit stream and sends the deframed data to a Crest Factor Reduction Algorithm module that is a component of the DSP unit 304. The Crest Factor Reduction Algorithm module reduces the Peak-to-Average Ratio of the incoming signal so as to improve the Power amplifier DC-to-RF conversion efficiency. The waveform is then presented to a Digital Predistorter block in the DSP 304. The digital predistorter compensates for the nonlinearities of the Power Amplifier 318 in an adaptive feedback loop. The downlink RF signal from the Power Amplifier is fed to duplexer 317 and is then routed to the antenna port 320.

Digital Upconverter 314 filters and digitally translates the deframed signal to an IF frequency. Digital to analog converter 309 performs D-A conversion and feeds an IF signal into upconverter 314. The Framer of the DSP unit 304 takes the data from the digital downconverter 305 and packs it into a Frame for transmission to the BTS via the optical fiber transceiver 301. Analog to Digital converter 308 is used to translate the analog RF uplink signal into digital signals. The receiver also includes a downconverter 313.

Ethernet cable can be connected to gigabit Ethernet switch 310, which is coupled to CPU 311 and is used to locally communicate with the DRU.

Figure 4:
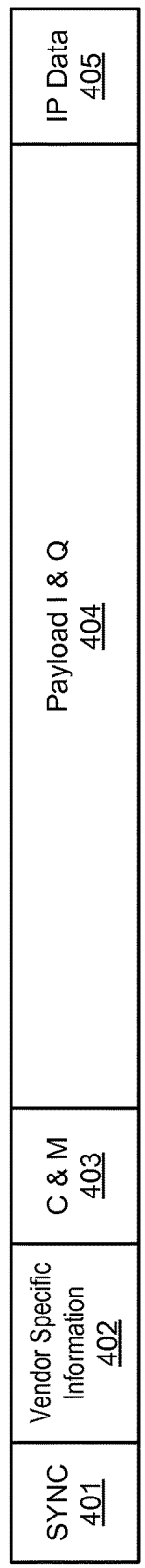
FIG. 4 shows the mapping of the data frame structure used to communicate between the DAU and the DRUs.

FIG. 4 shows an embodiment of the frame structure for the data that is transported between the DAU and DRUs. The data frame structure includes five portions or elements; the SYNC portion 401, the Vendor specific information portion 402, the control and management (C&M) portion 403, the payload data portion 404, and the IP Data portion 405. The SYNC portion 401 is used at the receiver to synchronize the clock of the transported data. The vendor specific information portion 402 is allocated for identifying the individual vendor information, which can include IP addresses associated with information and other information that can be specific to a particular vendor (e.g., a wireless carrier). The control and management portion 403 is used to monitor and control the remote units as well as perform software upgrades. Network control information and performance monitoring along with control signals can be transmitted in the C&M portion 403. The payload I/Q data portion 404 includes the cellular baseband data from the BTS 108 or from the RF antenna port 320. The IP data 405 is framed along with the payload I/Q data for transmission between the DAU and the DRUs. The IP data can include IP traffic passing through the Ethernet router 242 or through the Ethernet switch 310. The framed data is eventually scrambled/descrambled as demonstrated in FIG. 5. The framing of the IP data along with the cellular data enables both types of data to be transported through the system in either the upstream or downstream paths.

Figure 5:
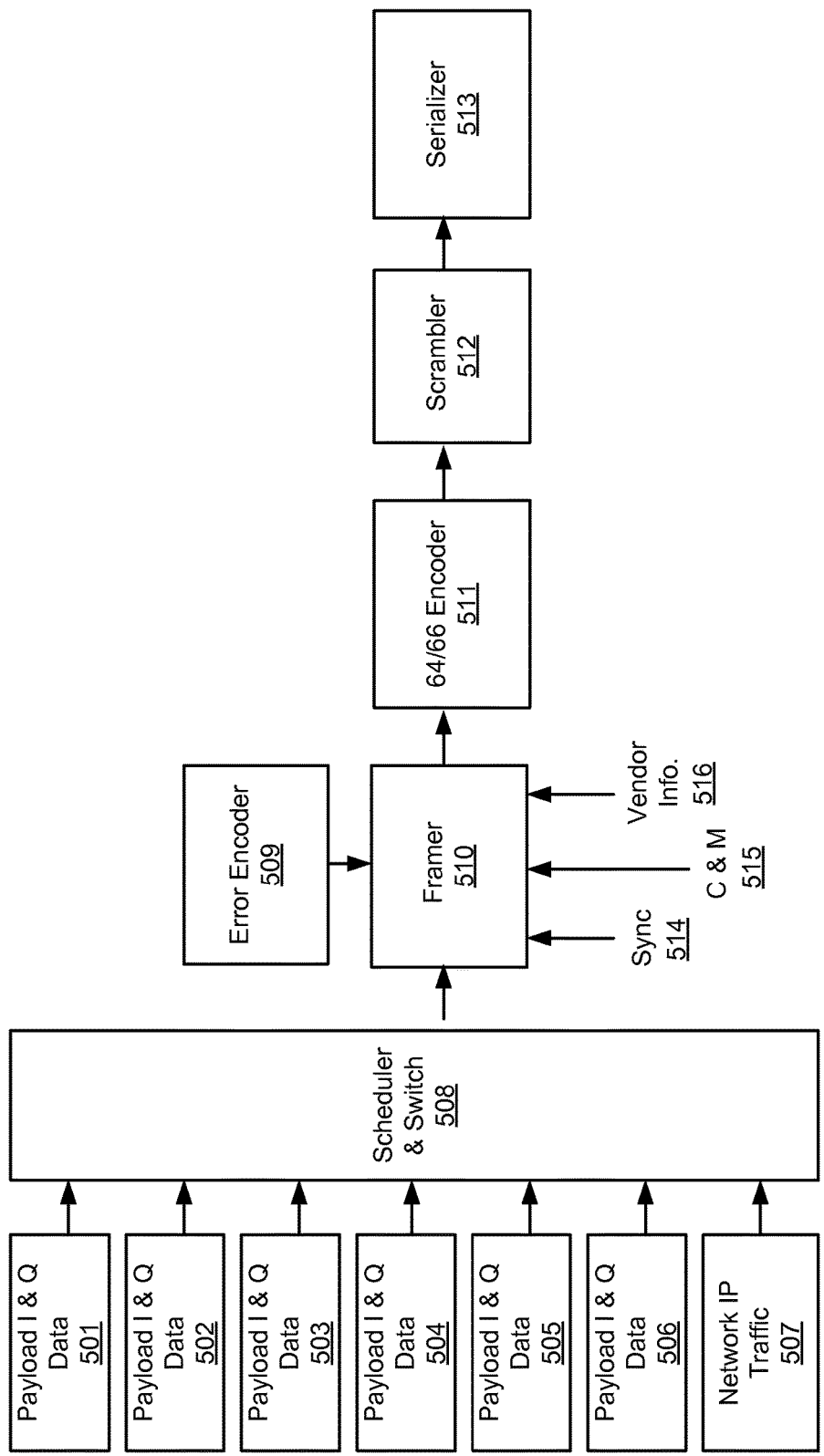
FIG. 5 is a block diagram of the coding structure at the Digital Access Unit (DAU) downlink path and Digital Remote Unit (DRU) uplink path.

FIG. 5 shows a block diagram of the coding structure of the transported data, including the payload I/Q data, from multiple inputs. FIG. 5 illustrates how the portions of the data frame structure shown in FIG. 4 are generated and illustrates how data can be coded for the DAU downlink path and the DRU uplink path. Accordingly, the processing illustrated in FIG. 5 occurs at the DAU for the Downlink path and at the DRU for the uplink path.

The scheduler and switch 508, Error Encoding 509, Sync 514, C&M 515 and Vendor Specific Information 516 are provided as inputs to the Framer 510. The payload data (i.e., the raw I & Q data) from multiple input ports (Payload I & Q data 501, 502, 503, 504, 505, and 506) as well as the IP Network Traffic (Network IP traffic 507) are buffered and delivered to the scheduler & switch 508. The scheduler & switch 508 collates the buffered payload data from the various ports along with the IP Network traffic for the Framer 510. The scheduler utilizes an algorithm to ensure fairness amongst the ports and distribute the allocated resources. The scheduler also decides on which of the ports the resources are allocated. As an example, IP Network data 507 can be allocated a lower priority in comparison to the payload data 501-506 from the various ports.

The Error Encoder 509 performs a cyclic redundancy check encoding of the transported data to insure that no errors occur during the data transportation from the DAU to the DRU. The framed data is scrambled using the scrambler 512 prior to being sent to serializer 513. One of the functions provided by the scrambler 512 is to remove long runs of zeroes and ones, for example, in the cellular data, so as to insure good frame timing synchronization. This functions ameliorates issues presented by the payload I & Q data, which includes the downlink cellular data from multiple ports, which fluctuates with usage and can be prone to long runs of zeroes or ones. Thus, embodiments of the present invention integrate scrambling as part of the framing process to improve system performance, particularly frame synchronization. As illustrated in FIG. 4, framing of the data provides for separation of the payload I & Q data 404 and the IP data 405 as separate elements of the frame in order to provide for separation of the two different types of data and the attendant security that is provided through such a separation into separate elements. After framing and encoding, scrambling of the frame illustrated in FIG. 4 is performed to improve frame synchronization.

Referring to FIG. 2, the correspondence between the functional blocks illustrated in FIG. 5 and the modules of the FPGA 205 are as follows. Payload I & Q data 501-506 is provided as outputs of the DSPs 232, 252, 254, and 256. The Network IP traffic 507 is provided as an output of the Ethernet router 242. This data and traffic is processed by various modules of FPGA 205, including framer/deframer 206, which includes functions provided by scheduler and switch 508, scrambler 512, and the functional units therebetween, including error encoder 509, framer 510, and encoder 511. The serializer/deserializer modules (SerDes) 207 in FIG. 2 correspond to serializer 513 in FIG. 5. For purposes of clarity, the data flow from the DSPs 232, 252, 254, and 256 to the framer/deframer 206 and the SerDes 207 is not illustrated in FIG. 2, but will be evident to one of skill in the art.

Figure 6:
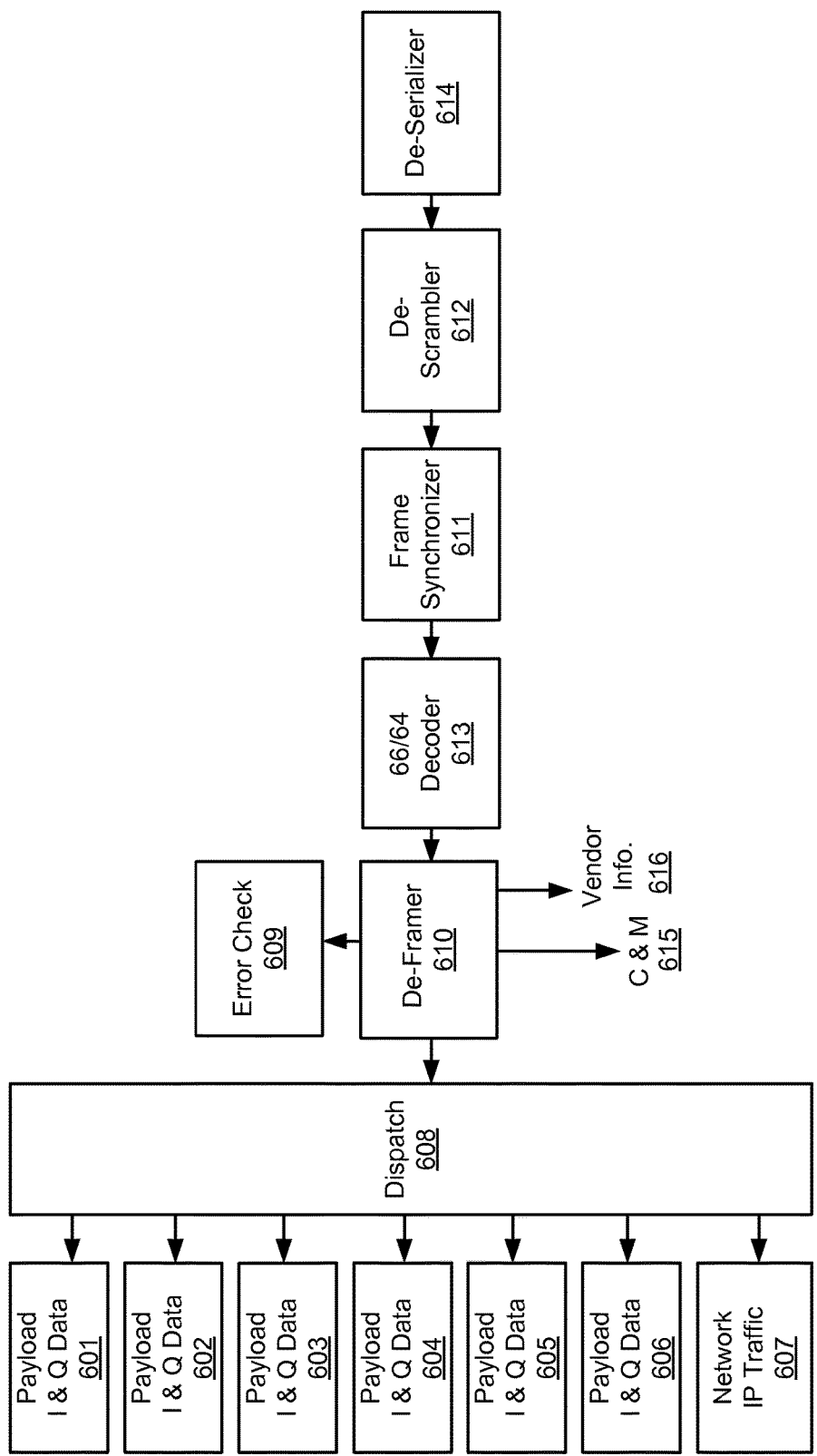
FIG. 6 is a block diagram of the coding structure at the Digital Access Unit (DAU) uplink path and Digital Remote Unit (DRU) downlink path.

FIG. 6 shows the block diagram of the decoding structure of the transported data. In FIG. 6, the decoding of data for the DAU in the uplink path and for the DRU in the downlink path is illustrated. The DAU receives the uplink data from the remote units. The serialized data then undergoes the following processing steps in the following modules: de-serializer 614, descrambler 612, frame synchronization 611, decoder 613, deframer 610 followed by dispatching 608 the data to the various output ports. The deframed data is decomposed into the C&M 615 data, Vendor information data 616, error check decoding 609 and the payload I & Q data. The dispatch 608 routes the scheduled payload data to the various ports. The descrambler performs the inverse operation to the scrambler 511.

Referring to FIG. 3, elements of the functionality illustrated in FIG. 6 correspond to functionality provided by FPGA 312. Functionality, including that of the decoder 613, de-scrambler 612, frame synchronizer 611, de-framer 610, error check 609, and dispatch 608 are performed by the DSP 304 positioned between the SerDes 303/307 and the DDC 305/DUC 306 depending on whether the uplink or downlink path are utilized.

In relation to both FIGS. 2 and 5 and FIGS. 3 and 6, functionality performed by the various processing modules can be shifted to other modules, as appropriate. For example, some or all of the functionality of the framer/deframer 206 illustrated in FIG. 2 could be implemented by the DSPs 232, 252, 254, and 256. One of ordinary skill in the art would recognize many variations, modifications, and alternatives.

FIG. 7A shows a block diagram of a scrambler 701 which represents the following scrambling function: $1+X^{39}+X^{58}$. The S# blocks 702/705 in FIGS. 7A and 7B are shift registers. FIG. 7B shows the corresponding descrambler 704 for this scrambling function. The scrambling/de-scrambling operation sums (i.e., binary addition) the received signal at summer 703 with a signal from 39 previous clock cycles and a signal from 58 previous clock cycles. Other specific numbers of clock cycles other than 39 and 58 can be utilized according to embodiments of the present invention.

Cellular traffic load varies depending on the time of day, number of active users and many other factors. Inactive periods will result in weak signal strength for the various data payloads. These weak signals can result in long runs of zeroes for the payload data. This poses a problem for high data rate transport of cellular signals. In particular, with long runs of zeroes, it is very difficult to maintain frame synchronization at the receiver. The scrambler/descrambler is an effective technique for mitigating these effects since it injects ones along with the zeroes in the data stream, which are then removed by the descrambler at the receive side. Referring to FIGS. 4 and 5, the payload I & Q data as well as the IP data is scrambled before being passed to the serializer.

It should be appreciated that the specific processing steps illustrated in FIG. 5 and FIG. 6 provide a particular embodiment of the present invention. Other sequences of steps may also be performed according to alternative embodiments. For example, alternative embodiments of the present invention may perform the steps outlined above in a different order. Furthermore, additional steps may be added or removed depending on the particular applications. One of ordinary skill in the art would recognize many variations, modifications, and alternatives.

Figure 8:
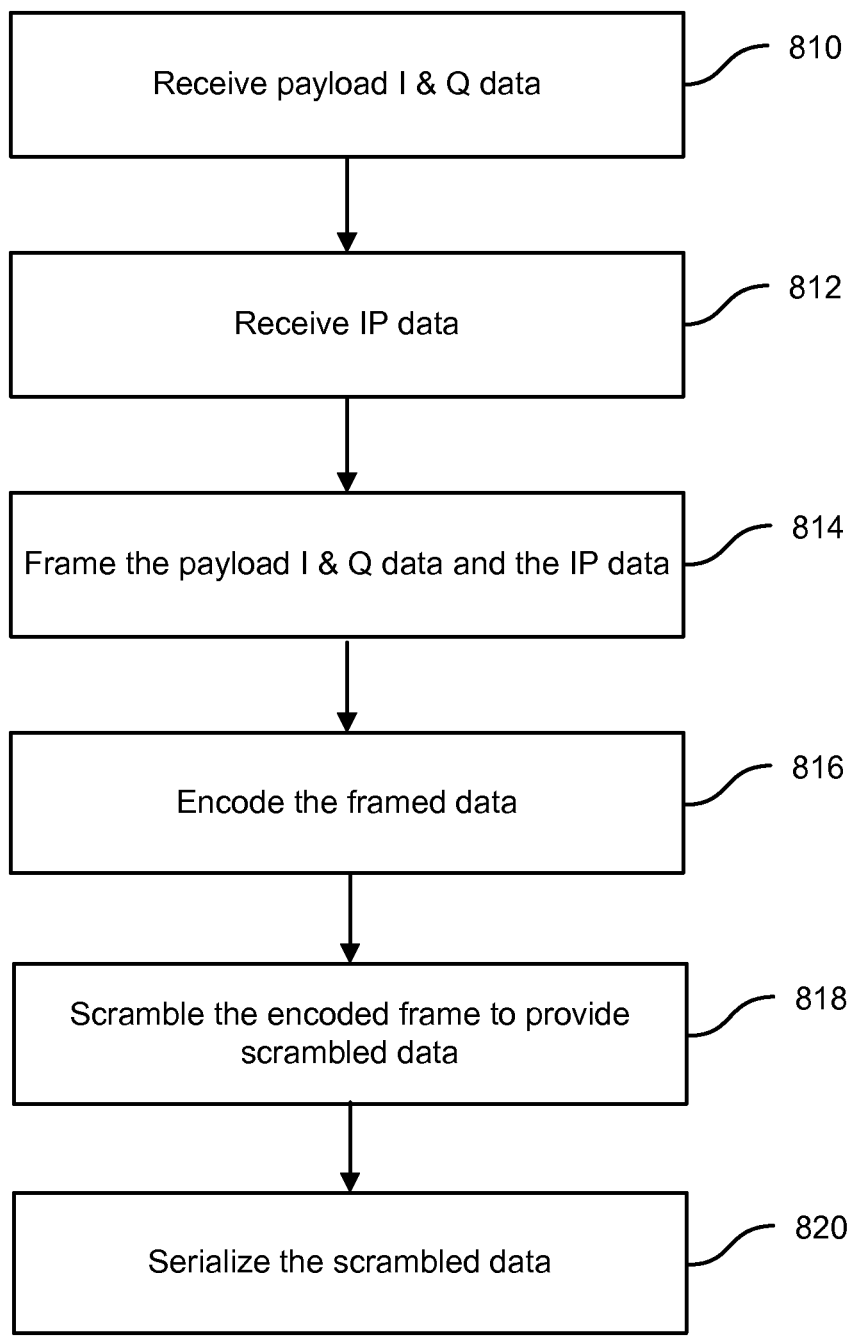
FIG. 8 is a simplified flowchart illustrating a method of providing serialized data according to an embodiment of the present invention.

FIG. 8 is a simplified flowchart illustrating a method of providing serialized data according to an embodiment of the present invention. The method includes receiving payload I & Q data (810) and receiving IP data (812). The payload I & Q data can be computed based on RF cellular traffic received at either a DAU or a DRU. The method also includes framing the payload I & Q data and the IP data (814) and encoding the frame (816). The framing of the payload I & Q data and the IP data, which can be independent of each other, can utilize independent elements of the frame to maintain the different kinds of data in different regions of the frame to provide for security and other benefits. The method further includes scrambling the encoded frame to provide scrambled data (818) and serializing the scrambled data (820).

In a particular embodiment, the method also includes receiving the serialized data, for example at a DRU, deserializing the serialized data; descrambling the deserialized data, determining frame synchronization information, and decoding the descrambled data. The method further includes deframing the synchronized and decoded data. Accordingly, the method can include providing the payload I & Q data and the IP data, which can be dispatched as illustrated in FIG. 6.

It should be appreciated that the specific steps illustrated in FIG. 8 provide a particular method of providing serialized data according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
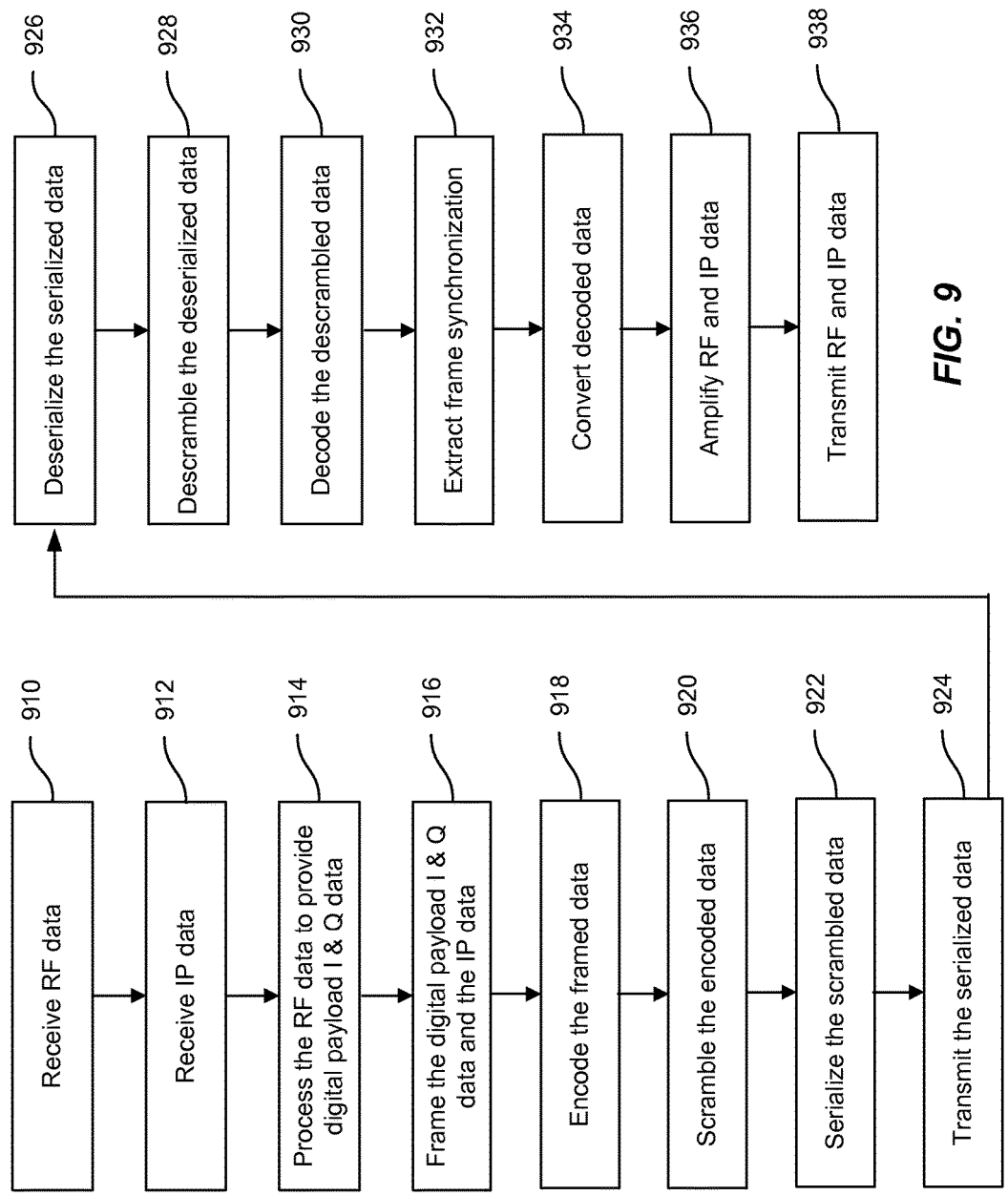
FIG. 9 is a simplified flowchart illustrating a method of transmitting RF data and IP data according to an embodiment of the present invention.

FIG. 9 is a simplified flowchart illustrating a method of transmitting RF data and IP data according to an embodiment of the present invention. The method includes receiving the RF data at an RF port of a Digital Access Unit (DAU) (910), receiving the IP data at an Ethernet port of the DAU (912), and processing the RF data to provide digital payload I & Q data (914). The RF data can include analog RF data, cellular data, or the like. The IP data can be independent from the RF data. The method also includes framing the digital payload I & Q data and the IP data to provide framed data (916), encoding the framed data (918), scrambling the encoded data (920), serializing the scrambled data (922), and transmitting the serialized data through an optical fiber to a Digital Remote Unit (DRU) (924). As illustrated in FIG. 4, the payload I & Q data and the IP data are framed as separate elements of the framed data in some embodiments.

At the DRU, the method includes deserializing the serialized data (926), descrambling the deserialized data (928), and decoding the descrambled data (930). In some embodiments, frame synchronization information is extracted (932) prior to decoding of the descrambled data (930) as illustrated in FIG. 6. In other embodiments, the method further includes extracting frame synchronization for the decoded data (932), converting the decoded data to provide a representation of the RF data and the IP data (934), amplifying the representation of the RF data and the IP data (936), and transmitting the amplified RF data and IP data from an antenna associated with the DRU. Referring to FIG. 3, conversion of the decoded data can include a digital to analog conversion process as illustrated by DAC 309 and upconversion by upconverter 314.

It should be appreciated that the specific steps illustrated in FIG. 9 provide a particular method of transmitting RF data and IP data according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

Appendix I is a glossary of terms used herein, including acronyms.

APPENDIX I

Glossary of Terms

ACLR Adjacent Channel Leakage Ratio
ACPR Adjacent Channel Power Ratio
ADC Analog to Digital Converter
AQDM Analog Quadrature Demodulator
AQM Analog Quadrature Modulator
AQDMC Analog Quadrature Demodulator Corrector
AQMC Analog Quadrature Modulator Corrector
BPF Bandpass Filter
CDMA Code Division Multiple Access
CFR Crest Factor Reduction
DAC Digital to Analog Converter
DET Detector
DHMPA Digital Hybrid Mode Power Amplifier
DDC Digital Down Converter
DNC Down Converter
DPA Doherty Power Amplifier
DQDM Digital Quadrature Demodulator
DQM Digital Quadrature Modulator
DSP Digital Signal Processing
DUC Digital Up Converter
EER Envelope Elimination and Restoration
EF Envelope Following
ET Envelope Tracking
EVM Error Vector Magnitude
FFLPA Feedforward Linear Power Amplifier
FIR Finite Impulse Response
FPGA Field-Programmable Gate Array
GSM Global System for Mobile communications
I-Q In-phase/Quadrature
IF Intermediate Frequency
LINC Linear Amplification using Nonlinear Components
LO Local Oscillator
LPF Low Pass Filter
MCPA Multi-Carrier Power Amplifier
MDS Multi-Directional Search
OFDM Orthogonal Frequency Division Multiplexing
PA Power Amplifier
PAPR Peak-to-Average Power Ratio
PD Digital Baseband Predistortion
PLL Phase Locked Loop
QAM Quadrature Amplitude Modulation
QPSK Quadrature Phase Shift Keying
RF Radio Frequency
RRH Remote Radio Head
RRU Remote Radio Head Unit
SAW Surface Acoustic Wave Filter
UMTS Universal Mobile Telecommunications System
UPC Up Converter
WCDMA Wideband Code Division Multiple Access
WLAN Wireless Local Area Network

What is claimed is:

1. A system for transporting data in a Distributed Antenna System, the system comprising:
at least one Digital Access Unit (DAU);
a plurality of Digital Remote Units (DRUs) coupled to the at least one DAU, wherein the plurality of DRUs are operable to transport signals between the plurality of DRUs and the at least one DAU;
wherein the at least one DAU includes:
a scheduler operable to allocate a first priority to payload I & Q data and a second priority to IP data;
a data transport coder comprising: a framer, an encoder, a scrambler, and a serializer; and
a data transport decoder comprising: a deserializer, a decoder, a descrambler, a frame synchronizer, and a deframer.

2. The system of claim 1 wherein the at least one DAU is coupled to the plurality of DRUs via at least one of Ethernet cable, Optical Fiber, Microwave Line of Sight Link, Wireless Link, or Satellite Link.

3. The system of claim 1 wherein the plurality of DRUs are connected in a daisy chain configuration.

4. The system of claim 1 wherein the plurality of DRUs are connected to the at least one DAU in a star configuration.

5. The system of claim 1 wherein a port of the at least one DAU is operable to connect to a Base Transceiver Station.

6. A system for transporting data in a Distributed Antenna System, the system comprising:
a plurality of Digital Access Units (DAUs), wherein the plurality of DAUs are coupled and operable to route signals between the plurality of DAUs;
a plurality of Digital Remote Units (DRUs) coupled to the plurality of DAUs and operable to transport signals between the plurality of DRUs and the plurality of DAUs;
wherein each of the plurality of DRUs includes:
a data transport coder comprising: a framer, encoder, scrambler and serializer;
a data transport decoder comprising: a deserializer, decoder, descrambler, frame synchronizer and deframer; and
a scheduler/dispatcher, wherein the scheduler is operable to allocate a first priority to payload I & Q data and a second priority to IP data.

7. The system of claim 6 further comprising a plurality of a plurality of Base Transceiver Stations (BTS).

8. The system of claim 6 wherein one or more elements of the data transport coder and data transport decoder are implemented in an FPGA.

9. The system of claim 6 wherein both payload I & Q data and IP data are processed by the data transport coder and data transport decoder.

10. A method of providing serialized data, the method comprising:
receiving payload I & Q data;
receiving IP data;
allocating a first priority to the payload I & Q data;
allocating a second priority to the IP data;
transmitting the payload I & Q data and the IP data to a framer according to the first priority and the second priority;
framing the payload I & Q data and the IP data;
encoding the frame;
scrambling the encoded frame to provide scrambled data; and
serializing the scrambled data.

11. The method of claim 10 further comprising:
receiving the serialized data;
deserializing the serialized data;
descrambling the deserialized data;
synchronizing the descrambled data;
decoding the descrambled data;
deframing the decoded data; and
providing the payload I & Q data and the IP data.

12. The method of claim 10 wherein the payload I & Q data is associated with RF cellular traffic.

13. The method of claim 10 wherein the IP data is independent of the payload I & Q data.

14. A method of transmitting RF data and IP data, the method comprising:
receiving the RF data at an RF port of a Digital Access Unit (DAU);
receiving the IP data at an Ethernet port of the DAU;
processing the RF data to provide digital payload I & Q data;
allocating a first priority to the digital payload I & Q data;
allocating a second priority to the IP data;
transmitting the digital payload I & Q data and the IP data to a framer according to the first priority and the second priority;
framing the digital payload I & Q data and the IP data to provide framed data;
encoding the framed data;
scrambling the encoded data;
serializing the scrambled data;
transmitting the serialized data through an optical fiber to a Digital Remote Unit (DRU);
deserializing the serialized data;
descrambling the deserialized data;
extracting frame synchronization for the descrambled data;
decoding the descrambled data;
converting the decoded data to provide a representation of the RF data and the IP data;
amplifying the representation of the RF data and the IP data; and
transmitting the amplified RF data and IP data from an antenna associated with the DRU.

15. The method of claim 14 wherein the RF data comprises analog RF data.

16. The method of claim 14 wherein the RF data comprises cellular data.

17. The method of claim 14 wherein the digital payload I & Q data and the IP data are framed as separate elements of the framed data.

18. The method of claim 14 wherein converting the decoded data comprises a digital to analog conversion process.

* * * * *

Disclaimer and Dedication

9,847,816 B2 - Zhuang, Qianqi, Richmond (CA); Stapleton, Shawn Patrick, Burnaby (CA). DIGITAL TRANSPORT OF DATA OVER DISTRIBUTED ANTENNA NETWORK. Patent dated December 19, 2017. Disclaimer filed June 3, 2021 by the inventors, Qianqi Zhuang et al.

I hereby disclaim the following complete claims 1, 2, 3, 4, 5, 6, 7, 8, 9, 10, 11, 12, 13, 14, 15, 16, 17, and 18 of said patent.

*(Official Gazette, November 16, 2021)*